US008854661B2

United States Patent
Saito (10) Patent No.: US 8,854,661 B2
(45) Date of Patent: Oct. 7, 2014

(54) TOOL FOR POSITIONING AN ICON ON A DISPLAY

(75) Inventor: Seiji Saito, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 342 days.

(21) Appl. No.: 13/225,977

(22) Filed: Sep. 6, 2011

(65) Prior Publication Data
US 2012/0092707 A1 Apr. 19, 2012

Related U.S. Application Data

(60) Provisional application No. 61/392,694, filed on Oct. 13, 2010.

(51) Int. Cl.
*G06F 3/12* (2006.01)
*H04N 1/00* (2006.01)

(52) U.S. Cl.
CPC ............ *G06F 3/1253* (2013.01); *G06F 3/1264* (2013.01); *H04N 1/00458* (2013.01); *H04N 1/00477* (2013.01); *H04N 1/00448* (2013.01); *G06F 3/1256* (2013.01); *G06F 3/1208* (2013.01); *G06F 3/1271* (2013.01)

USPC ............................ 358/1.15; 358/1.1; 358/1.13

(58) Field of Classification Search
USPC ........ 358/1.1, 1.13, 1.15, 400, 401, 500, 501, 358/527
See application file for complete search history.

(56) References Cited

U.S. PATENT DOCUMENTS

| 5,060,135 A * | 10/1991 | Levine et al. ................. 715/769 |
| 2006/0088331 A1 | 4/2006 | Inoue et al. |
| 2007/0143696 A1 * | 6/2007 | McComber ................... 715/771 |
| 2008/0218794 A1 * | 9/2008 | Oshima ........................ 358/1.15 |
| 2009/0164894 A1 * | 6/2009 | Takekawa et al. ............ 715/274 |

* cited by examiner

Primary Examiner — Thomas D Lee
(74) Attorney, Agent, or Firm — Amin, Turocy & Watson, LLP (57) ABSTRACT

According to one embodiment, a print setting apparatus includes an input section, a display section configured to display, on a same screen, an icon showing a tool to perform a process of binding sheets, a preview image showing a state of a sheet after printing, and one or plural area images displayed on the preview image, and a control section configured to change, when detecting that a specified coordinate from the input section is moved from a display area of the icon to a display area of the area image, the area image to an image showing a state after the process of binding the sheets is performed.

19 Claims, 9 Drawing Sheets

※ DOTTED LINES INDICATING RESPECTIVE AREAS IN THE DRAWING ARE NOT ACTUALLY DISPLAYED.

STAPLING POSITION IS SET ON FIRST PAGE. SIMULTANEOUSLY, PAGE OPENING DIRECTION IS ALSO SET.

IN SUBSEQUENT PAGE, ONLY AREA CORRESPONDING TO THE SET PAGE OPENING DIRECTION IS DISPLAYED, SO THAT INCONSISTENCY DOES NOT OCCUR IN THE SET PAGE OPENING DIRECTION. RESETTING OF STAPLE POSITION CAN BE PERFORMED FOR THE DISPLAYED AREA.

FIG.9

TOOL FOR POSITIONING AN ICON ON A DISPLAY

CROSS-REFERENCE TO RELATED APPLICATIONS

This application is based upon and claims the benefit of priority from: U.S. provisional application 61/392,694, filed on Oct. 13, 2010; the entire contents all of which are incorporated herein by reference.

FIELD

Embodiments described herein relate generally to a setting technique of an image forming apparatus performed when printing is performed.

BACKGROUND

Hitherto, when stapling or hole-punching (hereinafter referred to as finishing when necessary) is set at the time of printing, a setting screen provided by a printer driver or a setting screen displayed by a control panel of an image forming apparatus is used. The user sets by changing the screen to one corresponding to an appropriate hierarchy, pressing a button to validate the finishing, and pressing a selection button to select a position on a sheet where the finishing is to be performed.

However, this has a problem that the buttons must be pressed plural times before the finishing is set, and the setting can not be changed after the setting is performed. Even if the hierarchy is provided in order to solve the problem, the hierarchy to be operated becomes deep, and there is a problem that the number of times of button operation increases before the finishing is set.

Further, the user is required to memorize that the setting of the finishing belongs to which hierarchy, and when the user does not memorize, the user must search for the setting screen of the finishing when the setting of the finishing is performed.

Besides, when the setting screen of the related art is used, the setting of the finishing is performed by the button operation, and the user who does not perform the finishing on a daily basis is difficult to understand this operation.

DETAILED DESCRIPTION

In general, according to one embodiment, a print setting apparatus includes an input section, a display section configured to display, on a same screen, an icon showing a tool to perform a process of binding sheets, a preview image showing a state of a sheet after printing, and one or plural area images showing an area where an image forming apparatus performs the process of binding the sheets and shown on the preview image, and a control section configured to acquire, from the input section, a coordinate specified by a predetermined operation of a user in a display area of the display section, and to change, when detecting that the specified coordinate is moved from a display area of the icon to a display area of the area image, the area image specified after the movement to a first image showing a state after the process of binding the sheets is performed.

In the embodiment, a user interface is provided in which an icon of staple or hole-punch is moved to an appropriate area so that setting of finishing can be performed. The user interface described in the embodiment is easy for the user to intuitively understand, and the setting of stapling or hole-punching can be performed with a small number of times of operation.

Hereinafter, embodiments will be described with reference to the drawings.

Figure 1:
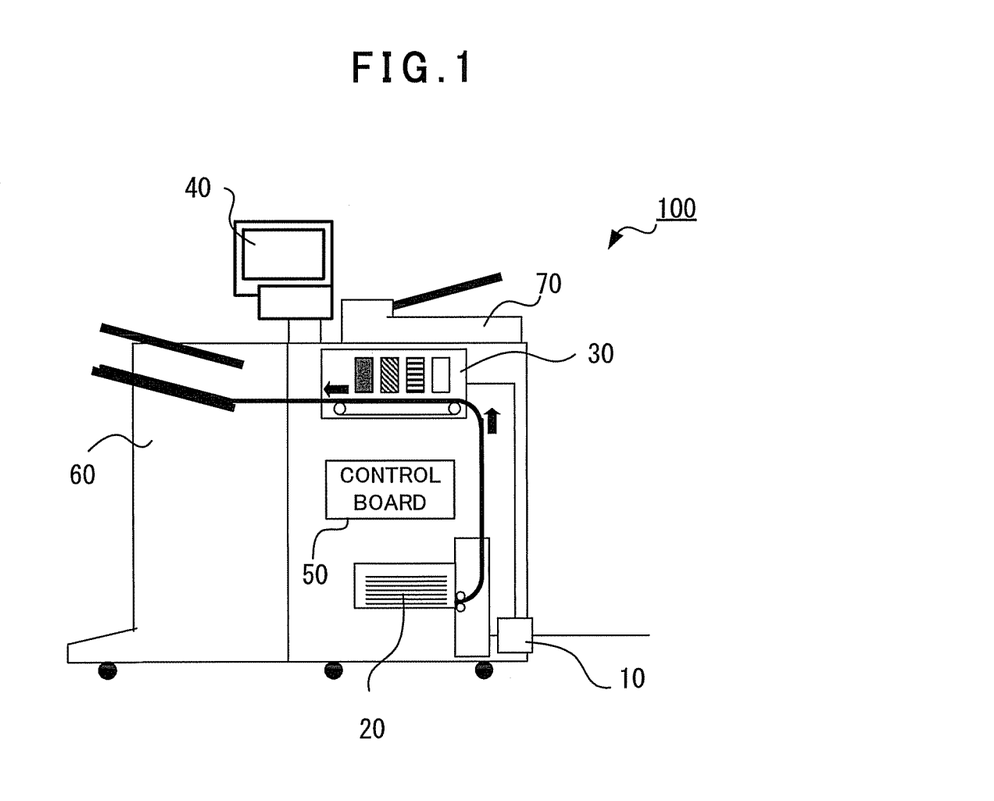
FIG. 1 is a view showing a structural example of an image forming apparatus.

FIG. 1 shows an example of a hardware structure of an image forming apparatus of an embodiment. The image forming apparatus 100 includes an external information input section 10, a sheet storage section 20, a printing section 30, an interface section 40, a control board 50, a finishing apparatus 60, and a reading section 70.

The external information input section 10 is a unit to receive print data generated by an external apparatus such as a personal computer (hereinafter referred to as a PC), and includes a network interface card. The sheet storage section 20 is a unit to store sheets and to convey the stored sheet to a main body part of the image forming apparatus 100, and includes a pickup roller and a tray.

The printing section 30 is a unit to form images of respective colors of C (cyan), M (magenta), Y (yellow) and K (black) on a sheet conveyed from the sheet storage section 20. The printing section 30 forms the image of print object data inputted from the external information input section 10 or image data of a document read by the reading section 70 on the sheet. The printing section 30 includes a process unit for each color, which includes a photoconductive drum, a charging roller and the like.

The interface section 40 is a control panel to display the state of the image forming apparatus 100 and the progress state of a job to the user, and to acquire instructions and setting from the user. In the interface section 40, a liquid crystal panel is used as a display section, and a touch panel type input device including a touch sensor is used as an input section.

The control board 50 is a board to overall control the respective hardware in the image forming apparatus 100. The finishing apparatus 60 is an apparatus to perform a process (stapling) to staple and bundle sheets on which images are formed and a process (hole-punching) to form holes in plural sheets at the same position based on the setting of the user. The finishing apparatus 60 includes at least a stapling device and a puncher device.

The reading section 70 is a unit to scan an image drawn on a sheet placed on a transparent tray and to convert it into image data. The reading section 70 includes at least the transparent tray on which a sheet of a print object is placed, a light-emitting device and a CCD image sensor (Charge Coupled Device Image Sensor), and may include an auto document feeder as shown in FIG. 1.

Figure 2:
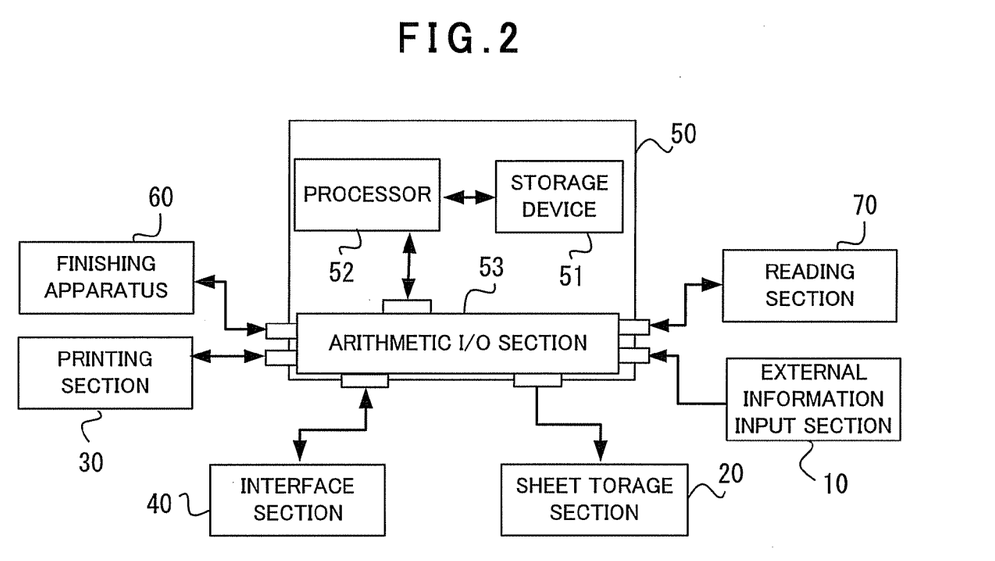
FIG. 2 is a block diagram of the image forming apparatus.

Here, the structure of the control board 50 will be described with reference to FIG. 2. The control board 50 includes a storage device 51, a processor 52 and an arithmetic I/O section 53. The storage device 51 is a device to store various data and programs, and includes, for example, a RAM (Random Access Memory), a ROM (Read Only Memory), a DRAM (Dynamic Random Access Memory), an SRAM (Static Random Access Memory), a VRAM (Video RAM), a hard disk drive or the like. The processor 52 is an arithmetic processing unit to control the respective hardware in the image forming apparatus 100 by executing programs stored in the storage device 51. The processor 52 is, for example, a CPU (Central Processing Unit) or an MPU (Micro Processing Unit).

The arithmetic I/O section 53 is a data bus to control data communication between the respective hardware in the image forming apparatus 100, and control signals and data from the processor 52 are transmitted to the respective hardware through the arithmetic I/O section 53.

Figure 3:
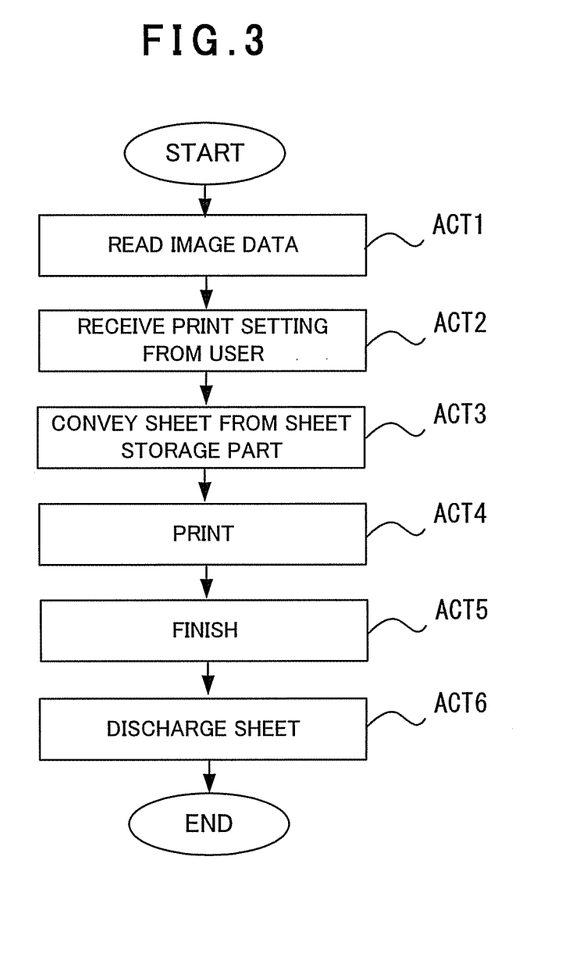
FIG. 3 is a flowchart showing an operation example of the image forming apparatus.

FIG. 3 is a flowchart showing an operation example of the image forming apparatus 100. The external information input section 10 acquires print job information including image data of a print object from an external apparatus. The acquired image data is stored in the storage device 51 through the arithmetic I/O section 53 by the control of the processor 52 (ACT 1). Incidentally, the image data may be data obtained by scanning a sheet in the reading section 70.

Next, the interface section 40 receives print setting information (the number of prints, selection of monochrome or color, designation of staple or hole punch, etc.) from the user (ACT 2). An example of the operation of ACT 2 will be described later in detail.

After the information of the print setting is acquired from the user, the sheet storage section 20 conveys the stored sheet to the main body part (ACT 3), and the printing section 30 forms an image of the image data read at ACT 1 on the conveyed sheet (ACT 4). Next, when the print job includes the setting of stapling or hole-punching, the finishing apparatus 60 performs finishing, such as stapling or hole-punching, on a bundle of printed sheets (ACT 5). Thereafter, the sheets are discharged (ACT 6).

Figure 4:
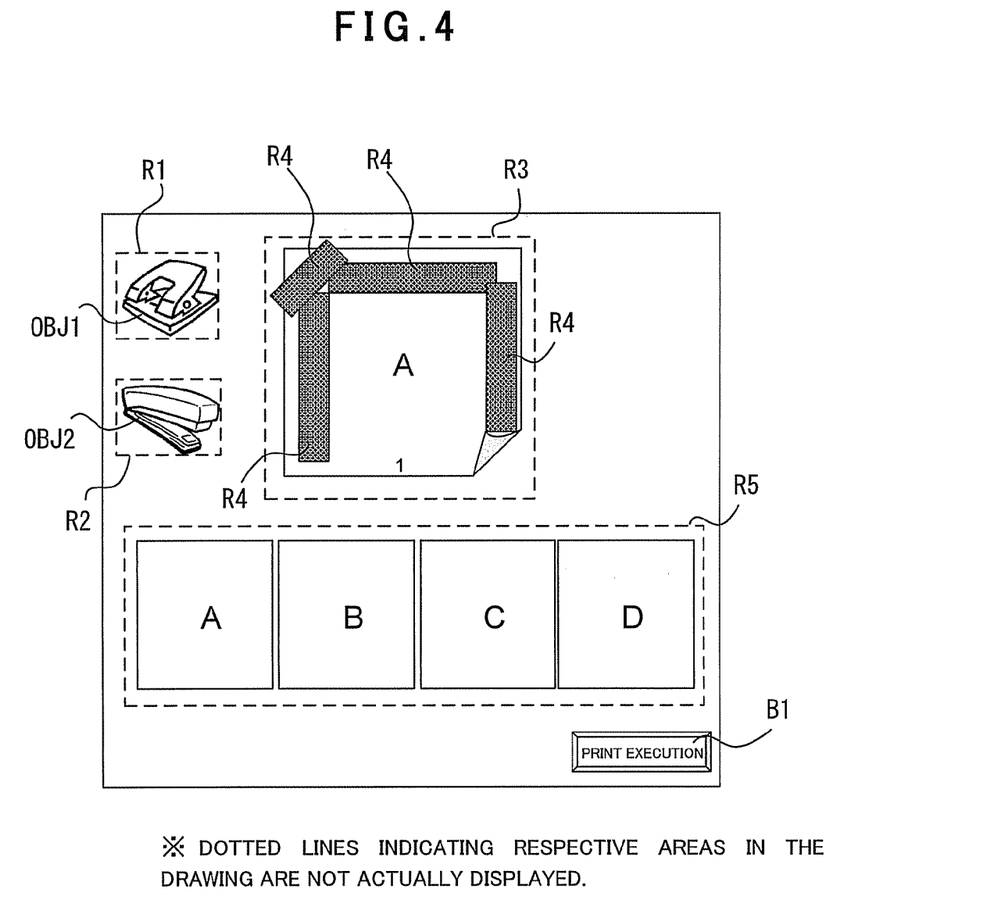
FIG. 4 is a view showing a display example in an interface section of an embodiment.

Next, the operation performed when the setting of stapling or hole-punching is performed at ACT 2 will be described. FIG. 4 shows an example of a finishing setting screen displayed by the interface section 40. As shown in FIG. 4, the interface section 40 arranges images in respective areas including a hole punch display area R1, a staple display area R2, a print preview area R3, areas R4 indicating ranges where the image forming apparatus 100 can perform finishing, and a read image display area R5, and displays the respective images on one screen. The images for display shown in FIG. 4 and the coordinate information of display positions are previously stored in the storage device 51. The display on the interface section 40 is controlled by executing a specified drawing program and a setting program by the processor 52.

In the initial state of the display, an icon OBJ1 depicting a puncher is arranged in the hole punch display area R1, and an icon OBJ2 depicting a stapler is arranged in the staple display area R2. The state of a sheet after printing is displayed in the print preview area R3.

An image arranged on the print preview area R3 and indicating an area where the image forming apparatus 100 can perform stapling and hole-punching is displayed in the area R4. In the example of FIG. 4, although a rectangular figure is displayed as the image indicating the area R4, any shape and any pattern, such as a circle or an ellipse, may be adopted as long as the user can recognize. The image forming apparatus 100 can perform stapling and hole-punching at the left end, the upper left end, the upper end, and the right end of the sheet. The areas corresponding to these positions are the areas R4, and the interface section 40 displays the rectangular figures indicating the areas R4. Besides, in this embodiment, although all of the plural areas R4 are simultaneously displayed, the implementation may be such that the rectangular image of the area R4 where a fingertip or a pen tip is placed is displayed, and the rectangular images of the other areas R4 are not displayed. Incidentally, the number of the areas R4 may be one.

The read image display area R5 is an area where the image data of the print object is listed in units of pages. Among pages displayed in the read image display area R5, an arbitrary page is touched (hereinafter, this operation of the user is referred to as "selection" when necessary), and the page is moved to the print preview area R3 and when the fingertip is separated from the touch panel (hereinafter, this operation of the user is referred to as "release"), the selected page is displayed in the print preview area R3.

When a print execution button 31 is pressed, the respective settings are decided, and printing is performed based on the image data and setting information included in the decided print job information.

Figure 5:
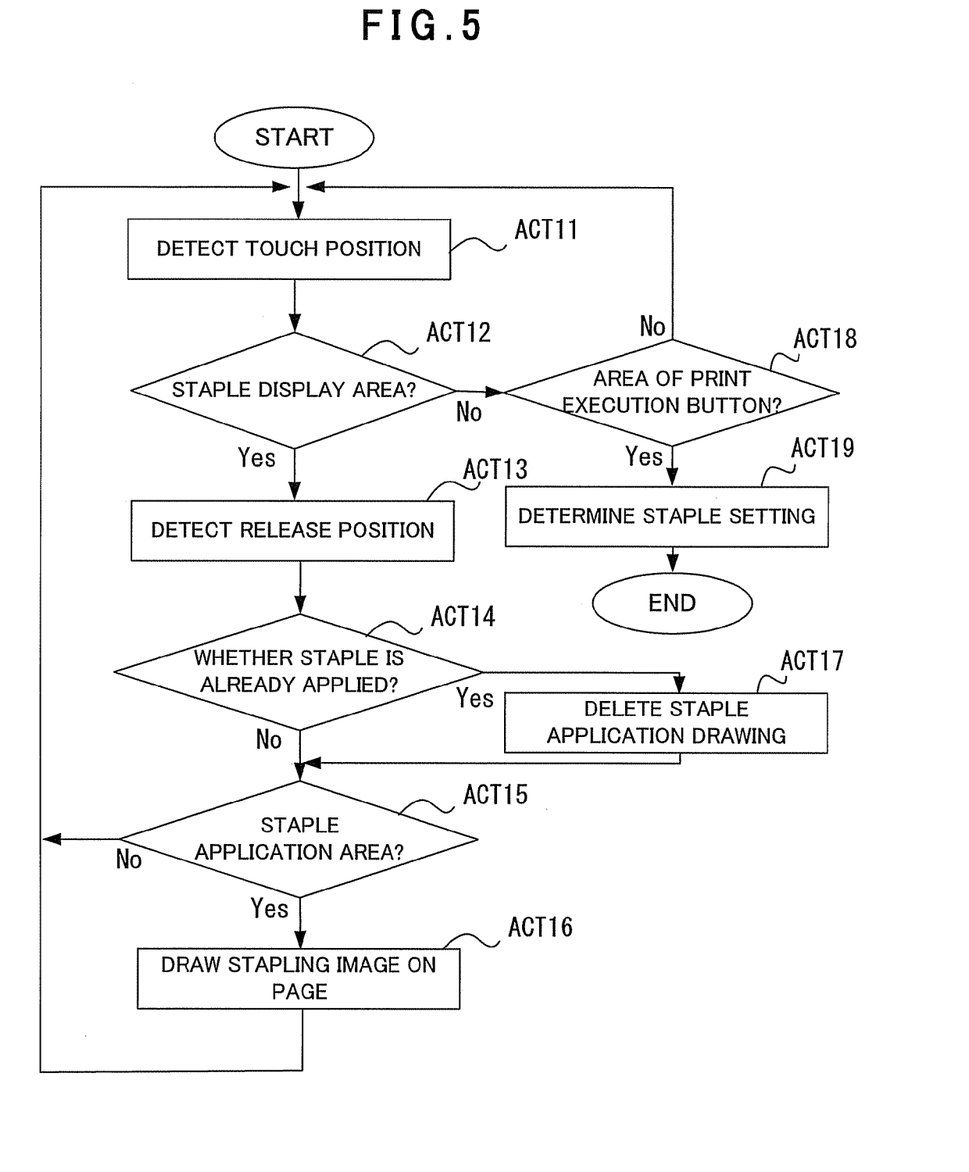
FIG. 5 is a flowchart showing an operation example when finishing is set in the embodiment.

The setting operation relating to the finishing of the image forming apparatus 100 will be described with reference to a flowchart of FIG. 5. In the example of FIG. 5, although setting of stapling is described, setting of hole-punching is also the same.

The processor 52 detects a position (position where the user touches the display screen) sensed by the touch sensor of the interface section 40 (ACT 11). This is performed such that the processor 52 acquires, from the interface section 40, coordinate information of the position where the user touches.

The processor 52 determines whether or not the touched coordinate is within the staple display area R2 (ACT 12). When the coordinate is within the area R2 (ACT 12, Yes), the processor 52 controls the displays so that the icon OBJ2 moves together with the movement of the fingertip.

Next, the processor 52 detects the release position of the icon OBJ2 (ACT 13). This detection is performed such that the processor 52 acquires, from the interface 40, coordinate information of the position where the fingertip of the user is separated from the touch panel.

Next, the processor 52 determines whether stapling is already set (ACT 14). Here, the processor 52 determines whether a value is set to specified flag data.

When stapling is not set (ACT 14, No), the processor 52 determines whether or not the release position is within one of the areas R4 (ACT 15). When the release position is within the area R4 (ACT 15, Yes), the processor 52 sets the specified value to the specified flag data, and changes the rectangular figure displayed in the area R4 of the release destination to an image showing a state after stapling is performed (ACT 16). Thereafter, the process returns to ACT 11.

When an area other than the staple display area R2 is touched in the determination of ACT 12 (ACT 12. No), the processor 52 determines whether the display area of the print execution button B1 is selected (ACT 18). Here, when the area of the print execution button B1 is selected (ACT 18, yes), the processor 52 determines the staple setting information (information such as the presence or absence of stapling, and the position of stapling), and writes the determinate staple setting information in the present print job information (ACT 19). The setting process is ended here, and after this, the process of ACT 3 of FIG. 3 is performed. On the other hand, when the touch position is not the area of the print execution button B1 (ACT 18, No), the process returns to ACT 11.

When the determination is made at the determination of ACT 14 that stapling is already set (ACT 14, Yes), the image indicting that stapling is already set is returned to the original rectangular figure, and the specified flag data is cleared to 0 (ACT 17). Thereafter, ACT 15 is executed.

Figure 6:
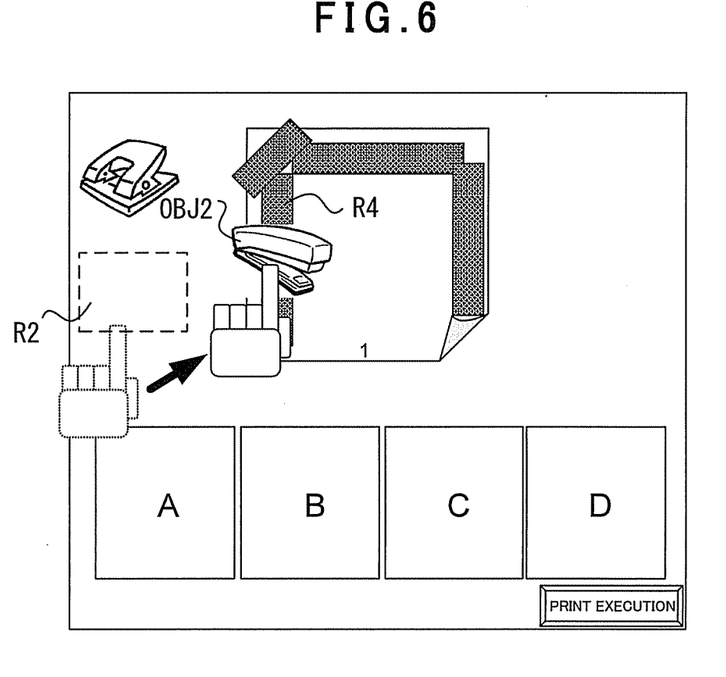
FIG. 6 is a view showing an example of a setting operation of the embodiment.
Figure 7:
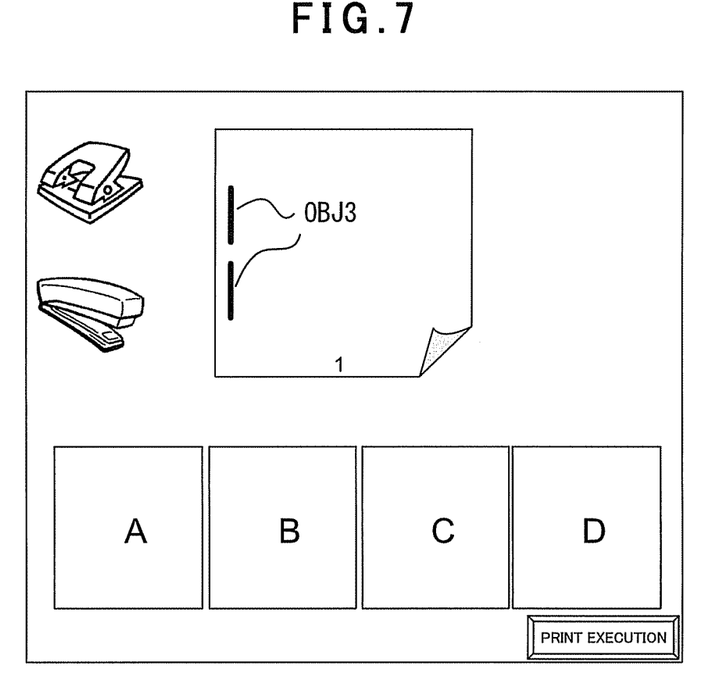
FIG. 7 is a view showing an example after the setting operation of the embodiment.

FIG. 6 shows a screen example of the above operation, and FIG. 7 shows a screen example after ACT 16 is performed. As shown in FIG. 6, the user selects, for example, the icon OBJ2 of the staple display area R2, and releases the icon into the area R4 at the left end in the print preview image. After the release, as shown in FIG. 7, the image of the area R4 is changed to an image OBJ3 of a state after the stapling. Since the example here is the stapling at the left end, two rod-like icons imitating the state of metal parts after the stapling are displayed as the OBJ3 (see FIG. 7). However, when the icon ONJ2 is released in the area R4 at the upper left end, one rod-like icon is displayed. In the case of hole-punching, when the icon OBJ1 (icon of hole punch) is released in the area R4 at the left end, the upper end or the right end, two circular icons imitating the state after hole-punching are displayed. However, when the icon OBJ1 is released in the area at the upper left end, one circular icon is displayed.

Besides, in the embodiment, when the position of stapling is set, a page opening direction is also set simultaneously. For example, when the staple setting is performed at the left end of a bundle of sheets, the page opening direction naturally becomes leftward opening, and when the staple setting is performed at the upper end, the page opening direction naturally becomes upward opening. From this, the processor 52 performs setting on the image formation so that the opening direction corresponds to the position of stapling (writes a set value in the data in the print job information). For example, when staple setting is performed at the left end or the right end, the processor 52 sets so that the margin at the stapled side becomes large on both the front page and the back page. Besides, when staple setting is performed at the upper end, the processor 52 sets so that the margin at the stapled side becomes large on both the front page and the back page, and sets so that an image inverted upside down is formed on the back page.

When the staple position is set on a halfway page, there is a case where when another page is displayed, inconsistency occurs in the direction of a page and the size of a margin. In view of this problem, an implementation is conceivable in which with respect to the opening direction of a bundle of sheets, setting can be made only when the first page is displayed in the print preview area R3.

Figure 8:
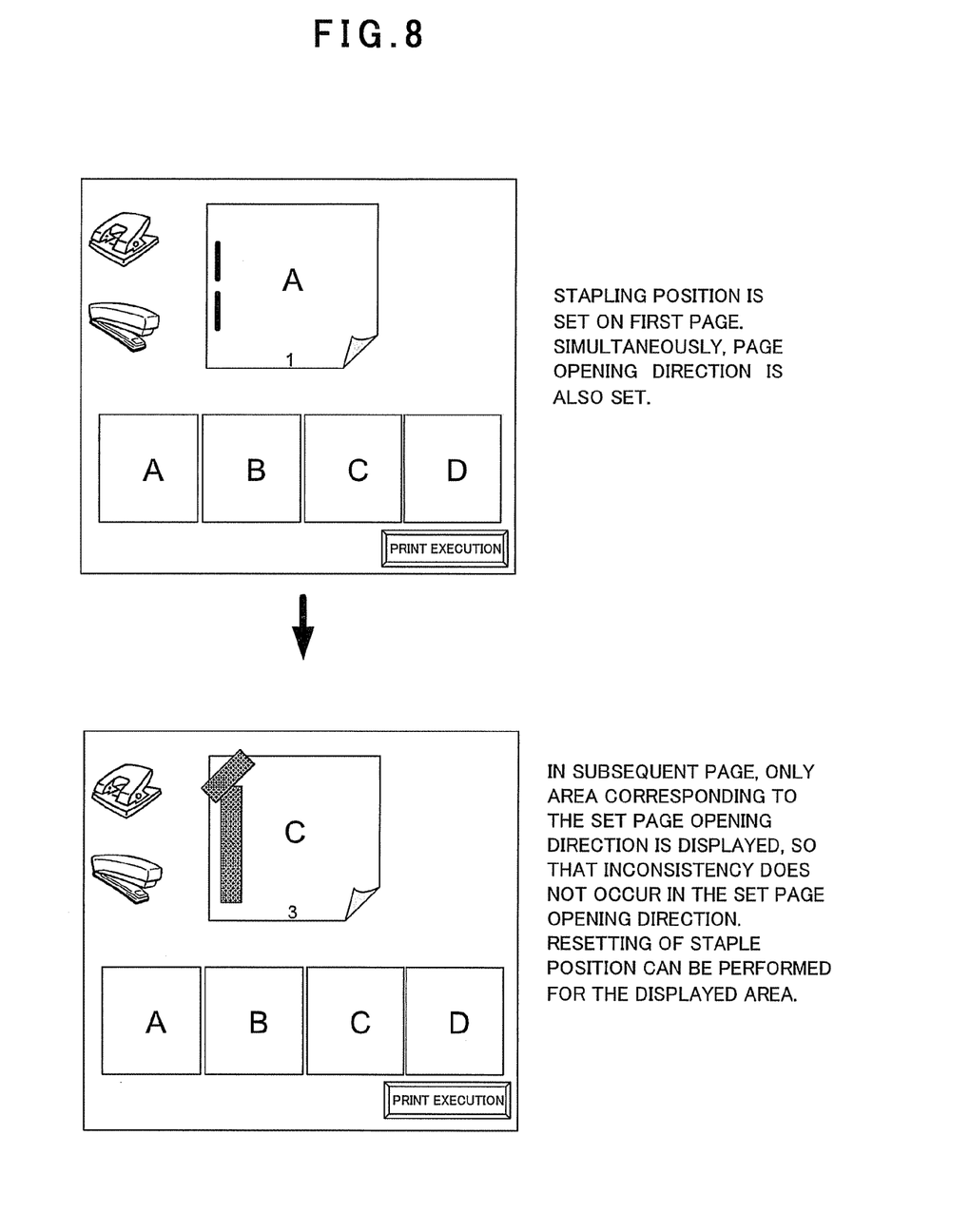
FIG. 8 is a view showing an area on another page where finishing can be performed after the position of finishing is set on the first page.

In this implementation, the staple position is set on the first page, and the page opening direction is also set. With respect to the subsequent pages, in the designation of staple, only the area corresponding to the opening direction is displayed and can be selected. A description will be made by use of FIG. 8. When the area R4 at the left end is selected on the first page, the opening direction is simultaneously set so that the page is turned from right to left (data indicating the opening direction is temporarily stored in the storage device 51). Here, when the position of staple is set at the right end or the upper end of the subsequent page, there is a possibility that contradiction of data and inconsistency in the display of the interface section 40 occur with respect to the size of a margin, up-and-down inversion and the like. In order to prevent this inconsistency from occurring, the processor 52 controls so that when the subsequent page is displayed in the print preview area R3, only the areas R4 at the left end and the upper left end are displayed to prevent the contradiction from occurring in the opening direction. Besides, the processor controls so that areas other than the left end and the upper left end are not selected. As stated above, the position of the finishing is set on the first page, and then, when the other page is displayed in the print preview area R3, the processor 52 displays only the area R4 corresponding to the data indicating the opening direction, and enables selection thereof.

As another implementation example, in this embodiment, after the icon OBJ2 is once released in one of the areas R4 and the icon OBJ3 is displayed in the area R4, the display of the icon OBJ3 is reflected at the same position of all pages. Specifically, an arbitrary page is displayed in the print preview area R3, and after the process from ACT 11 to ACT 16 is performed on the page, even when another page is displayed in the print preview area R3, the processor 52 controls so that the display of the icon OBJ3 is kept in the already designated area R4.

Figure 9:
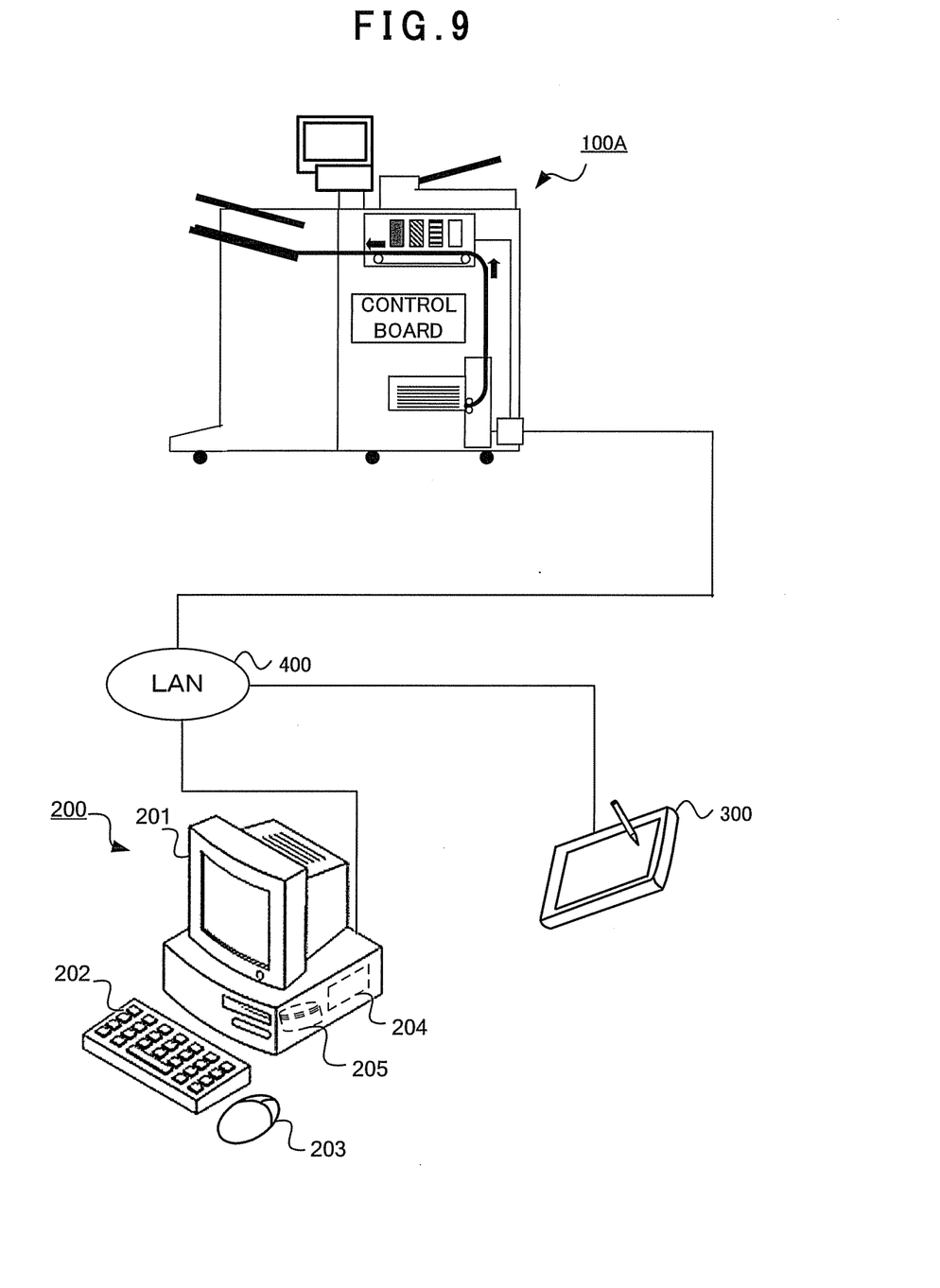
FIG. 9 is a view showing structural example in which a PC or a tablet PC is a print setting apparatus.

In this embodiment, although the structure including the interface section 40 and the control board 50 in the image forming apparatus 100 is described as the print setting apparatus, as shown in FIG. 9, a PC 200 connected to a former image forming apparatus 100A through a LAN (Local Area Network) 400 can be used as a print setting apparatus. That is, the same operation as the above explanation can be realize by using a CPU 204, a memory 205, a monitor 201 as a display section, a keyboard 202 as an input section and a mouse 203 of the PC 200. Besides, a tablet PC 300 including a CPU, a memory, and a touch panel type display can also be used. When the embodiment is applied, although the user interface is different from the related art, the same telegraphic form as the related art can be applied to the data structure of the setting information, print job information and the like. Thus, even when the PC 200 or the tablet PC 300 is used as the client apparatus (print setting apparatus) for print setting, since the transmitted print job information and setting information have the former form, the former image forming apparatus 100A can be applied as it is. Incidentally, the LAN 400 may be wired or wireless.

By applying this embodiment, the user interface can be provided in which an icon of a tool to perform finishing is specifically indicated, an area where the finishing can be performed is specified on the preview image, and setting of finishing can be performed by selection of the icon and release operation. This can provide the setting environment of stapling and hole-punching, which is intuitively easier to understand than the related art setting having the hierarchical structure. In the related art setting screen, plural tabs of "basic setting", "finishing", "image quality" and the like are arranged in one line at the upper part of one print setting dialog, and the layout is such that most of the display area in the dialog is changed by changing the tab. When the user sets stapling by using the related art setting screen, the user is required to presses the tab for finishing, and to press the staple in the tab and the check box of the touch panel. This operation is troublesome, and the user is required to memorize that the staple setting exists in the finishing tab. In general, in the setting dialog when printing is performed, information in the basic setting tab is initially displayed, and the staple setting is not displayed. Thus, when the use frequency of the staple is not high, the operation of searching for the staple setting screen is generated at each time. When the embodiment is applied, the print preview is displayed, and the setting operation intuitively easy to understand can be performed by using the print preview.

As described above in detail, according to the technique described herein, the setting operation of the finishing becomes easy.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A print setting apparatus comprising:
an input section;
a display section configured to display, on a same screen, an icon which is already displayed at a predetermined initial position from initial state of a screen and moves from the initial position together with a movement of a coordinate shown by the input section showing a tool to perform a process of binding sheets, a preview image showing a state of a sheet after printing, and one or plurality of area images showing an area where an image forming apparatus performs the process of binding the sheets and displayed on the preview image; and
a control section configured to acquire, from the input section, a coordinate specified by a predetermined operation of a user in display areas of the display section, and to change, when detecting that the specified coordinate is moved from a display area of the icon to a display area of the area image, the area image specified after the movement to a first image showing a state after the process is performed,
wherein the control section controls the display section to keep the display of the changed first image even when a page presently displayed as the preview image is changed to another page after the specified area image is changed to the first image.

2. The apparatus of claim 1, wherein
the control section sets a print job and causes the image forming apparatus to perform the process to a bundle of printed sheets at a same position as a position of the specified area image.

3. The apparatus of claim 1, wherein
the control section sets a print job and causes an opening direction of a bundle of sheets after printing to become a direction corresponding to the specified area image.

4. The apparatus of claim 3, wherein
the control section sets the opening direction only when a first page of the bundle of sheets is displayed as the preview image on the display section.

5. The apparatus of claim 4, wherein
after the control section sets the opening direction on the first page, when another page is displayed as the preview image on the display section, the control section controls to display only an area image corresponding to the set opening direction.

6. The apparatus of claim 1, wherein
after the area image is changed to the first image, when the specified coordinate is moved from the display area of the icon to a display area of another area image, the control section returns the presently displayed first image to the original area image, and changes the another area image to the first image.

7. The apparatus of claim 1, wherein
the icon is an icon depicting a stapler,
the process of binding the sheets is a process of binding the plurality of sheets by stapling, and
the first image is one or plurality of rod-like images.

8. The apparatus of claim 1, wherein
the icon is an icon depicting a puncher,
the process of binding the sheets is a process of providing holes in the plurality of sheets at a same position, and
the first image is one or plurality of circular images.

9. The apparatus of claim 1, wherein
the input section is a touch panel type input device.

10. An image forming apparatus comprising:
an input section;
a display section configured to display, on a same screen, an icon which is already displayed at a predetermined initial position from initial state of a screen and moves from the initial position together with a movement of a coordinate shown by the input section showing a tool to perform a process of binding sheets, a preview image showing a state of a sheet after printing, and
one or plurality of area images showing an area where the process of binding the sheets is performed and displayed on the preview image;
a control section configured to acquire, from the input section, a coordinate specified by a predetermined operation of a user in display areas of the display section, and to change, when detecting that the specified coordinate is moved from a display area of the icon to a display area of the area image, the area image specified after the movement to a first image showing a state after the process is performed;
a printing section configured to form images on a plurality of conveyed sheets; and
a finishing section configured to perform the process to a bundle of sheets on which the images are formed by the printing section and at a same position as a position where the area image is changed to the first image by the control section,
wherein the control section controls the display section to keep the display of the changed first image even when a page presently displayed as the preview image is changed to another page after the specified area image is changed to the first image.

11. The apparatus of claim 10, wherein
the control section sets a print job and causes an opening direction of the bundle of sheets after printing to become a direction corresponding to the specified area image.

12. The apparatus of claim 11, wherein
the control section sets the opening direction only when a first page of the bundle of sheets is displayed as the preview image on the display section.

13. The apparatus of claim 12, wherein
after the control section sets the opening direction on the first page, when another page is displayed as the preview image on the display section, the control section controls to display only an area image corresponding to the set opening direction.

14. The apparatus of claim 10, wherein
the input section is a touch panel type input device.

15. A print setting method of a print setting apparatus, comprising:
displaying, on a same screen, an icon which is already displayed at a predetermined initial position from initial state of a screen and moves from the initial position together with a movement of a coordinate shown by an input section showing a tool to perform a process of binding sheets, a preview image showing a state of a sheet after printing, and one or plurality of area images showing an area where an image forming apparatus performs the process of binding the sheets and displayed on the preview image;
acquiring, from the input section, a coordinate specified by a predetermined operation of a user in display areas; and changing, when it is detected that the specified coordinate is moved from a display area of the icon to a display area of the area image, the area image specified after the movement to a first image showing a state after the process is performed, wherein the acquiring controls the displaying to keep display of the changed first image even when a page presently displayed as the preview image is changed to another page after the specified area image is changed to the first image.

16. The method of claim 15, further comprising:
setting a print job to cause the image forming apparatus to perform the process to a bundle of printed sheets at a same position as a position of the specified area image.

17. The method of claim 15, further comprising:
setting a print job to cause an opening direction of a bundle of sheets after printing to become a direction corresponding to the specified area image.

18. The method of claim 15, wherein
the icon is an icon depicting a stapler,
the process of binding the sheets is a process of binding the plurality of sheets by stapling, and
the first image is one or plurality of rod-like images.

19. The method of claim 15, wherein
the icon is an icon depicting a puncher,
the process of binding the sheets is a process of providing holes in the plurality of sheets at a same position, and
the first image is one or plurality of circular images.

* * * * *